CONSTANT TEMPERATURE CHAMBER, IN PARTICULAR A CRYSTAL OVEN

Filed Dec. 20, 1954 3 Sheets-Sheet 1

Jan. 5, 1960 H. J. KEEN ET AL 2,920,175

CONSTANT TEMPERATURE CHAMBER, IN PARTICULAR A CRYSTAL OVEN

Filed Dec. 20, 1954 3 Sheets-Sheet 2

CONSTANT TEMPERATURE CHAMBER, IN PARTICULAR A CRYSTAL OVEN

Filed Dec. 20, 1954

United States Patent Office 2,920,175

Patented Jan. 5, 1960

2,920,175

CONSTANT TEMPERATURE CHAMBER, IN PARTICULAR A CRYSTAL OVEN

Harry J. Keen, Middletown, Robert J. Papaieck and Alfred John Gilbert, Jr., Matawan, N.J., assignors to Lavoie Laboratories, Inc., Morganville, N.J., a corporation of New Jersey Application December 20, 1954, Serial No. 476,268

6 Claims. (Cl. 219—19)

The present invention relates to the stabilization of the temperature of electrical elements and particularly to a piezoelectric crystal assembly including a thermostatically controlled oven.

Piezoelectric crystals are used in many high frequency circuits, and one of their principal functions is that of stabilizing high frequency oscillators. The resonant frequency of such crystals varies with temperature, and, therefore, it is desirable to stabilize the crystal temperature. Unless the crystal temperature is controlled, it may be varied over a wide range by the ambient temperature or by heat produced by other circuit elements. Such temperature variations would cause intolerable changes of the crystal frequency.

It is known to mount a crystal in an insulated heated enclosure. The crystal is, however, connected to external terminals by a pair of leads. These leads should be short and straight to minimize their inductance resistance and capacitance. These leads, being efficient heat conductors, make the crystal subject to ambient temperatures.

Accordingly, an object of the present invention is to maintain the temperature of a piezoelectric crystal nearly constant.

Another object of the invention is to quickly correct temperature deviations.

Another object of the invention is to sense and counterbalance ambient temperature changes before they change the crystal temperature appreciably.

Another object of the invention is to bring the crystal temperature from a low value to its proper operating point at an accelerated rate.

Another object of the invention is to increase the heating of the crystal if the temperature departure thereof or the crystal cooling conditions exceed certain values.

Another object of the invention is to reduce "overshooting" of the temperature corrections.

A further object of the invention is to stabilize the temperature of a crystal by heating the elements which normally drain heat from the crystal.

These and other objects of the invention are obtained by a crystal assembly including a plurality of thermostatically controlled heaters. One heater is called a coarse heater and is in series with a thermostat which operates at a temperature considerably below the desired crystal temperature. Another thermostat, called the fine thermostat, is in series with the coarse heater and with a so-called fine heater. The fine thermostat operates at a temperature close to the desired crystal temperature. The fine thermostat is arranged so as to be influenced principally by the crystal temperature, but also to sense the ambient temperature. Thus, the fine thermostat is provided with a metallic tube which extends through a solid metallic body in which the crystal is mounted. The metallic tube extends to the base of the assembly in order to sense also the ambient temperature. The heaters are wound mainly on the metallic body enclosing the crystal, but a portion of the fine heater or of both heaters may be wound on the tube of the fine thermostat. The direct heating of the tube compensates for its heat loss and prevents the lag in sensing the temperature of the metallic body, and thus reduces "overshooting" of the temperature corrections. The coarse thermostat senses the ambient temperature, but it is prevented from closing in response to the ambient temperature when the metallic body enclosing the crystal is near its desired temperature. For this purpose a heat conductive connection is provided between the coarse thermostat and the metallic body. Thus the coarse heater is prevented from being energized, in response to a low ambient temperature, when the crystal temperature is such that the coarse heater is not needed.

Other advantages and objects of the invention and its mode of operation will be fully understood from the following detailed description and the accompanying drawing, in which.

Figure 1:
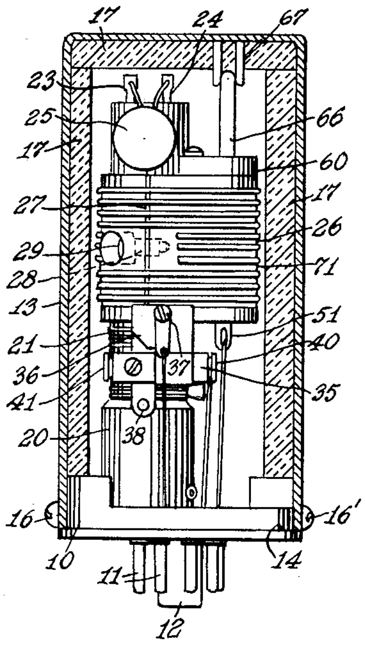
Fig. 1 is a front view, partly in section, of one embodiment of the invention, with the wiring removed.
Figure 2:
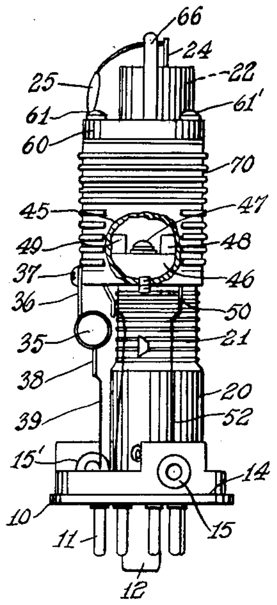
Fig. 2 is a side view of the crystal assembly with the cover removed.
Figure 3:
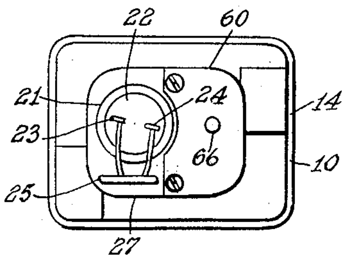
Fig. 3 is a top view of Fig. 1, with the cover removed.

Referring to the drawing, particularly Figs. 1 and 2, the apparatus comprises a substantially rectangular octal plug base 10 formed by suitable insulating material and provided with a plurality of pin terminals 11. The base may include also a centrally located, keyed, insulating guide pin 12. A cover or shield can 13 forms a housing for the assembly. The cover 13 seats on a shoulder 14 of the base 10. The base is provided with a pair of threaded bushings 15, 15'. The cover 13 is held in place by screws 16, 16' extending through holes in the cover and into the threaded bushings 15, 15' in the base 10. The sides and top of the cover 13 are lined with heat insulating material 17, such as fiberglass wool.

A fine thermostat 20 is enclosed in a metallic tube 21 which is fastened to the base 10. Various types of suitable thermostats may be used. A specific example of a suitable thermostat is that disclosed in Patent No. 2,664,-483, issued to W. C. Broekhuysen December 29, 1953. The top of tube 21 is closed by a header 22 having terminals 23 and 24. A radio frequency bypass condenser 25 is connected between terminals 23 and 24 to reduce the effects of sparking between the thermostat switch contacts. A grooved metallic body 26 is mounted on the upper portion of tube 21. The body 26 is provided with a bore into which tube 21 fits closely. The body 26 has a cut 27 (Fig. 1) and on one side of the cut 27 the body is tapped, as indicated by the numeral 28, while on the other side of the cut, body 26 is provided with a hole 29. By means of a screw 30 (Fig. 4) extending through hole 29 into tapped hole 28, the cut 27 may be partly closed, whereupon the body 26 clamps the tube 21. Tube 21 is preferably filled with an inert gas such as helium in order to eliminate the effects of moisture and oxygen.

A coarse thermostat 35 (Figs. 2, 4, 5) is supported by a bracket 36 fixed to the metal body 26 by a screw 37. A lug 38 on bracket 36 is connected to one of the terminals 11 of base 10 by a conductor 39 (Fig. 2). The contacts 40 and 41 of the thermostat 35 are at the two ends thereof.

The metallic body 26 has a chamber 45 (Fig. 2) adapted to receive a crystal holder 55. At the bottom of chamber 45 a crystal socket 46 is mounted. The crystal socket 46 is fastened to the bottom of chamber 45 by a screw 47 and has two pin terminal receptacles 48 and 49 from which terminals 50 and 51 extend through holes in the bottom of the metal body 26. A pair of conductors 52 and 53 connect the crystal terminals 50, 51 to two terminals of the base 10.

Figure 7:
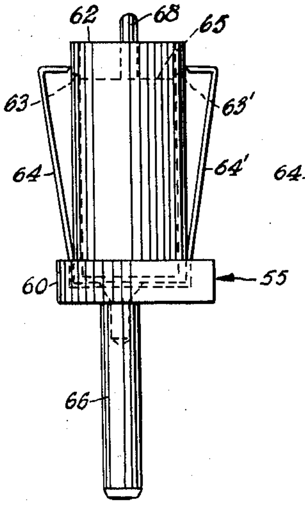
Fig. 7 is a side view of the crystal holder shown in inverted position.
Figure 8:
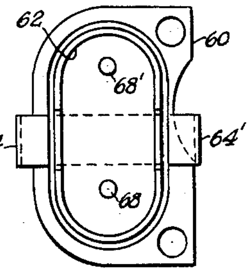
Fig. 8 is a bottom view of the crystal holder.
Figure 9:
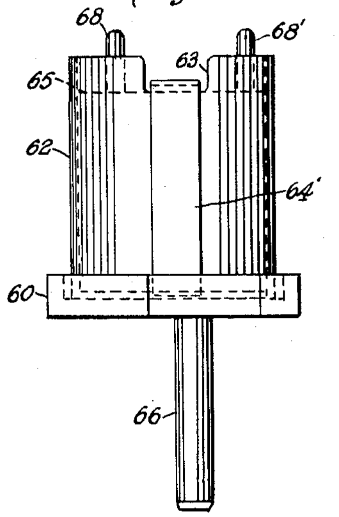
Fig. 9 is a side view of the crystal holder looking at the right of Fig. 7.

Referring particularly to Figs. 7 and 8, the crystal chamber 45 is closed by a crystal holder assembly having a cover plate 60 which is fastened to the metallic body 26 by two screws 61, 61'. A crystal case 62 of insulating material is fixed to the cover plate 60. Crystal case 62 is shaped and dimensioned so as to fit snugly into chamber 45. The bottom of case 62 is open and a pair of slots 63, 63' are formed on opposite sides of the case 62. A pair of L-shaped retaining springs 64, 64' are fastened at one end to the cover plate 60 and have right angle bends adapted to extend through slots 63, 63' and engage the bottom of the crystal 65, which has terminals 68, 68'. Thus the retaining springs can hold the crystal 65 within the case 62, while the crystal holder assembly is being lifted out of the chamber 26 and the crystal 65 can then be removed by spreading the retaining springs. To facilitate the insertion of the entire unit in the shield can, the cover plate is provided with a guide pin 66 which extends into a locating socket 67 (Fig. 1) fixed to the top of the shield can 13.

Figure 4:
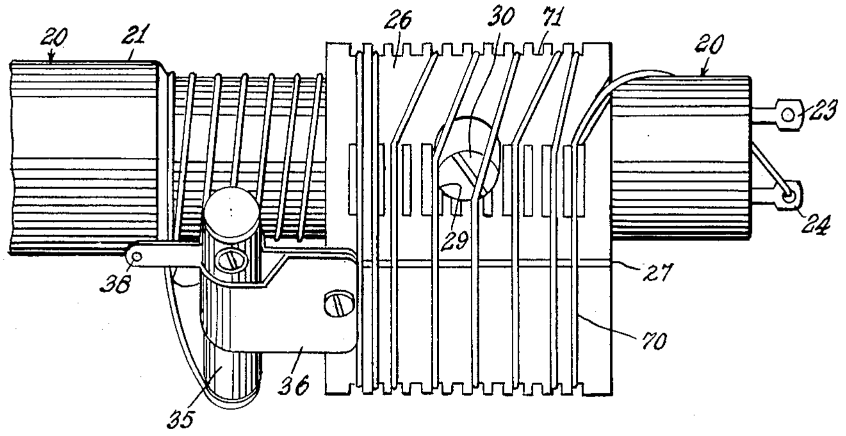
Fig. 4 is a plan view showing the fine heater winding.
Figure 5:
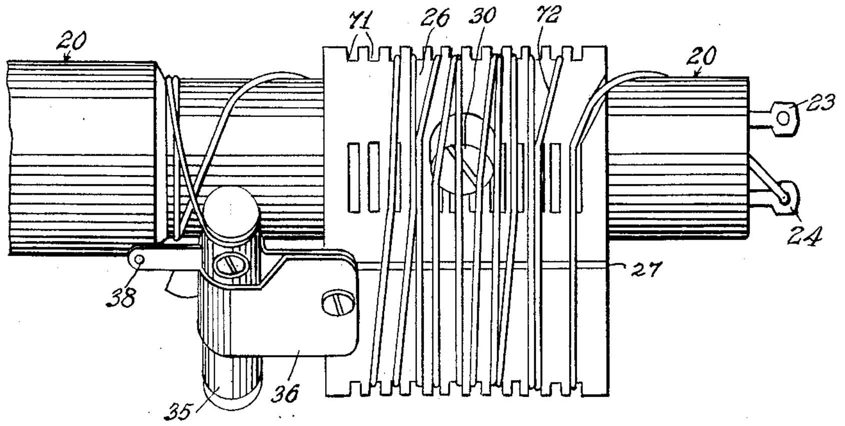
Fig. 5 is a plan view showing the coarse heater winding.

A fine heater winding 70 is wound on the metallic body 26 and tube 21, as shown in Fig. 4. The winding is kept in place on the metallic body 26 by the grooves 71 in the rounded corners of body 26. One end of the winding is connected to terminal 24 of the fine thermostat 20 and the other end of the heater winding is connected to terminal 40 (Fig. 1) of the coarse thermostat 35. About one fourth of the winding 70 may be on tube 21 and the remainder on body 26. The coarse heater winding 72 is wound on the metallic body 26 and tube 21, as shown in Fig. 5, for example, although, if desired a larger portion of the winding may be on tube 21. As a specific example, each heater winding may have a 15 watt power consumption. The coarse heater winding 72 is connected between terminals 24 and 41 (Fig. 1) of the two thermostats.

Figure 6:
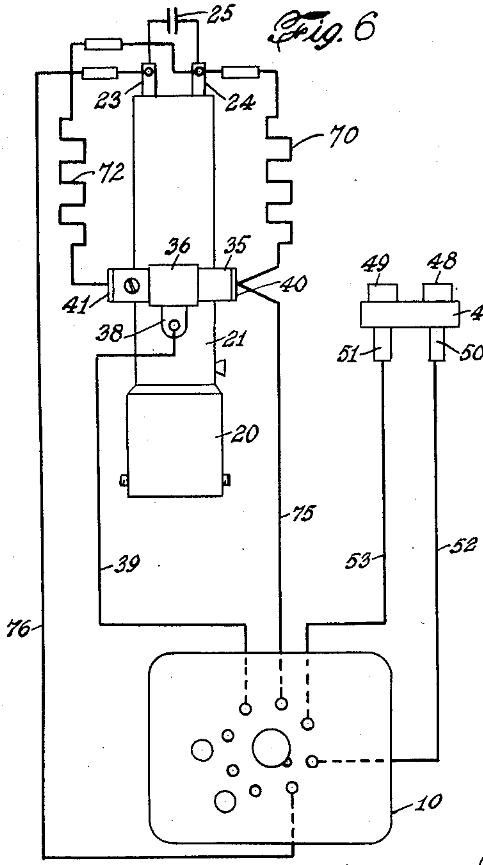
Fig. 6 is a schematic diagram of the circuit connections of the crystal assembly.

The manner in which the various elements are interconnected is shown in Fig. 6. Crystal terminals 50 and 51 are connected by short, nearly straight leads 52, 53, to a pair of terminals 11 of base 10. Another short conductor 39 connects lug 38 to another of the base terminals 11. Conductor 39 serves as a heat conductor tending to change the temperature of the bracket 36, and thereby the thermostat 35, in accordance with the ambient temperature. Fine heater winding 70 is connected at one end to a source of heating current (not shown) by conductor 75. The other end of the winding 70 is connected to terminal 24 of the fine thermostat and thence through the fine thermostat, terminal 23, and conductor 76 to the other side of the source of heating current. The coarse heater 72 is connected in series with the coarse thermostat 35 to conductor 75 and, on the other side, to terminal 24, then through thermostat 21 and terminal 23 to conductor 76. Thus the coarse heater 72 is energized only when both thermostats close. Condenser 25 is connected between terminals 23 and 24.

The operation of the apparatus is as follows: The crystal operating temperature is chosen to be greater than the ambient temperature, say 75° C. The coarse thermostat 35 is set to close at 65° C., and any temperature less than 65° C., while the fine thermostat 20 is closed at a temperature about 10° higher than the closing temperature of the coarse thermostat. Since tube 21 extends to the base 10, and also through the metallic body 26, this tube is subject to the ambient temperature and the temperature of body 26. The expansion and contraction of tube 21 opens and closes the thermostat 20. An example of a typical operating condition may be one in which the ambient temperature is −60° C., and the heat loss through the leads lowers the crystal temperature about 2° C. However, the heat loss of tube 21 causes it to contract and close the thermostat contacts and energize the fine heater 70. Heater 70 raises the metallic body 26 to a temperature of 77° C., thereby keeping the crystal temperature at its desired value of 75° C. The portion of the fine heater 70 on tube 21 counteracts the cooling effect on block 26 of the heat loss of tube 21, thus rendering metallic body or block 26 less subject to ambient temperature.

The coarse thermostat 35 is spaced from block 26 toward the base 10 and is connected to the base by conductor 39 so as to sense the ambient temperature. By virtue of conductor 39, thermostat 35 is more sensitive to the ambient temperature than is thermostat 20. At the same time it is connected to block 26 by the bracket 36, and therefore it is also sensitive to the temperature of body 26. At an ambient temperature of 60° C., the coarse thermostat would not be operated although it is set to act at 65° C., because of the heat received from body 26 through bracket 36. Were it not for the heat received from body 26 by thermostat 35, it would operate continuously when the ambient temperature is 60° C. When the ambient temperature is very low, however, or the crystal and ambient temperatures are low, the coarse thermostat will close and the coarse heater 72 will assist the heater 70 in bringing the crystal to its correct temperature quickly. Thus the warm up time from −40° C. is only seven minutes. In view of the fact that the fine thermostat senses the ambient temperature and thereby anticipates heat losses, the temperature corrections are made sooner and the deviations are minimized. Overshooting of the temperature compensations is minimized by heating tube 21 directly, and thus making the fine thermostat directly responsive to the heating effect. Were it not for this direct heating of the tube 21 the temperature of tube 21 would have a certain time lag with respect to the temperature of metallic body 26, which time lag would permit overheating of body 26.

It has been found that the crystal temperature can be held within plus or minus 0.15° C. over an ambient temperature range of −65° C. to the operating temperature of the crystal. The crystal being insulated from the metallic body 26 by casing 62 is heated mainly by radiation from the metallic body 26.

The invention has been illustrated by the disclosure of one specific example thereof, but it will be understood that many changes may be made within the spirit and scope of the invention as defined in the following claims.

What is claimed and desired to be secured by Letters Patent:

1. A piezoelectric crystal oven comprising a metallic body, means for mounting a piezoelectric crystal in said metallic body, a first thermostat in thermal contact with said metallic body, a first heater winding connected in series with said first thermostat, said first heater winding having one portion adjacent to said metallic body and another portion adjacent to said first thermostat, a second thermostat disposed outside but adjacent said metallic body, a second heater winding connected in series with said second thermostat, a portion of said second heater winding being adjacent to said first thermostat, said second heater winding also being serially connected to said first thermostat so that second heater winding is energizable only when said first and second thermostats are activated.

2. The apparatus of claim 1 including insulating enclosing means for substantially enclosing said apparatus, and having a heat conducting means extending from said second thermostat through said enclosing means to sense outside temperature.

3. A constant temperature oven comprising a first thermostat having an elongated tubular heat conductive shell, a metallic body surrounding said shell for a portion of its length and in heat conductive relation to said shell, said body being eccentric of said shell and having a cavity therein to receive an element to be maintained at constant temperature, a second thermostat mounted externally of said shell and body, a first electrically heating winding controlled by said first thermostat and comprising turns wound on said metallic body and other turns wound on a portion of said shell, a second electrical heating winding controlled by said second thermostat and comprising turns wound on said metallic body, and a heat insulating enclosure surrounding said shell, metallic body, second thermostat and heating windings.

4. A constant temperature oven according to claim 3, in which a heat conductor extends from said second thermostat to the exterior of said insulating enclosure to render said second thermostat responsive to outside temperature.

5. A constant temperature oven according to claim 3, in which said second heating winding is connected in series with both of said thermostats so as to be energized only when both of said thermostats are activated.

6. A constant temperature oven comprising an insulated enclosure, a heat conducting and heat storing housing within said enclosure and having a constant temperature cavity therein, first control means sensitive to the temperature of said housing, first heating means responsive to said first control means for heating said housing, second control means inside said enclosure and outside but adjacent said housing and sensitive to the temperature of said housing, a heat conductor extending from said second control means to the outside of said enclosure so that said second control means is also sensitive to outside temperature, and second heating means responsive to both said first and second control means for heating said housing.

References Cited in the file of this patent

UNITED STATES PATENTS

| | | |
|---|---|---|
| 2,170,664 | Romander | Aug. 22, 1939 |
| 2,410,041 | Bokovoy | Oct. 29, 1946 |
| 2,422,526 | Burch | June 17, 1947 |
| 2,438,345 | Miller | Mar. 23, 1948 |
| 2,462,850 | Eaton | Mar. 1, 1949 |
| 2,470,134 | Bitner | May 17, 1949 |
| 2,556,865 | Baldwin | June 12, 1951 |
| 2,651,731 | Overbey | Sept. 8, 1953 |
| 2,747,069 | Miller | May 22, 1956 |
| 2,791,706 | Font | May 7, 1957 |